United States Patent
Proidl

(10) Patent No.: US 7,430,752 B2
(45) Date of Patent: Sep. 30, 2008

(54) METHOD FOR EVALUATING A BONUS FROM AUTHORIZED PLAYBACKS OF A RECORDING ON A DEVICE OTHER THAN A DEVICE USED TO MAKE THE RECORDING

(75) Inventor: Adolf Proidl, Vienna (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 1343 days.

(21) Appl. No.: 10/084,756

(22) Filed: Feb. 25, 2002

(65) Prior Publication Data

US 2002/0120517 A1    Aug. 29, 2002

(30) Foreign Application Priority Data

Feb. 27, 2001    (EP)    .................... 01890053

(51) Int. Cl.
 H04N 7/16    (2006.01)
 H04N 7/173    (2006.01)
 G06Q 30/00    (2006.01)

(52) U.S. Cl. .................. 725/23; 725/1; 725/104; 705/14

(58) Field of Classification Search .......... 725/23, 725/1, 4; 705/14
See application file for complete search history.

(56) References Cited

U.S. PATENT DOCUMENTS

| 5,003,384 | A | * | 3/1991 | Durden et al. | ............... 725/104 |
|---|---|---|---|---|---|
| 5,010,571 | A | | 4/1991 | Katznelson | ............... 380/4 |
| 5,027,400 | A | * | 6/1991 | Baji et al. | ............... 725/116 |
| 5,124,980 | A | * | 6/1992 | Maki | ............... 370/498 |
| 5,133,079 | A | * | 7/1992 | Ballantyne et al. | ............... 725/146 |
| 5,619,247 | A | * | 4/1997 | Russo | ............... 725/104 |
| 6,118,741 | A | | 9/2000 | Mimnagh et al. | ............... 369/47 |
| 6,473,749 | B1 | * | 10/2002 | Smith et al. | ............... 707/2 |
| 6,738,905 | B1 | * | 5/2004 | Kravitz et al. | ............... 713/194 |

FOREIGN PATENT DOCUMENTS

WO    WO9903277    1/1999

* cited by examiner

*Primary Examiner*—Hoang-Vu A Nguyen-Ba

(57) ABSTRACT

In a "Pay per view" system (5), a playback device (1,2,3) of a user of the "Pay per view" system (5) obtains a playback authorization by an authorizing device (4) from a recording carrier (13,14) before playback of a coded playback information item (CWI) of a chargeable film. For granting the playback authorization, the authorizing device (4) bills a playback charge to the user. Inter alia, recorder identification information items (RKWI) identifying recording devices (1,2) that have contributed to creating the copy of the recording carrier (13,14) played back by the playback device (1,2,3) are stored on the recording carrier (13,14). In the course of granting the playback authorization, bonus information evaluating means (21,22) store the recorder identification information items (RKWI) transferred by playback devices (1,2,3) to the bonus information evaluating means (21,22). At billing instants, the bonus information evaluating means (21,22) transfer a bonus information item (BI) for the users of the recording devices (1,2) identified by the recorder identification information items (RKWI) and grant these users benefits.

13 Claims, 1 Drawing Sheet

Figure 1:
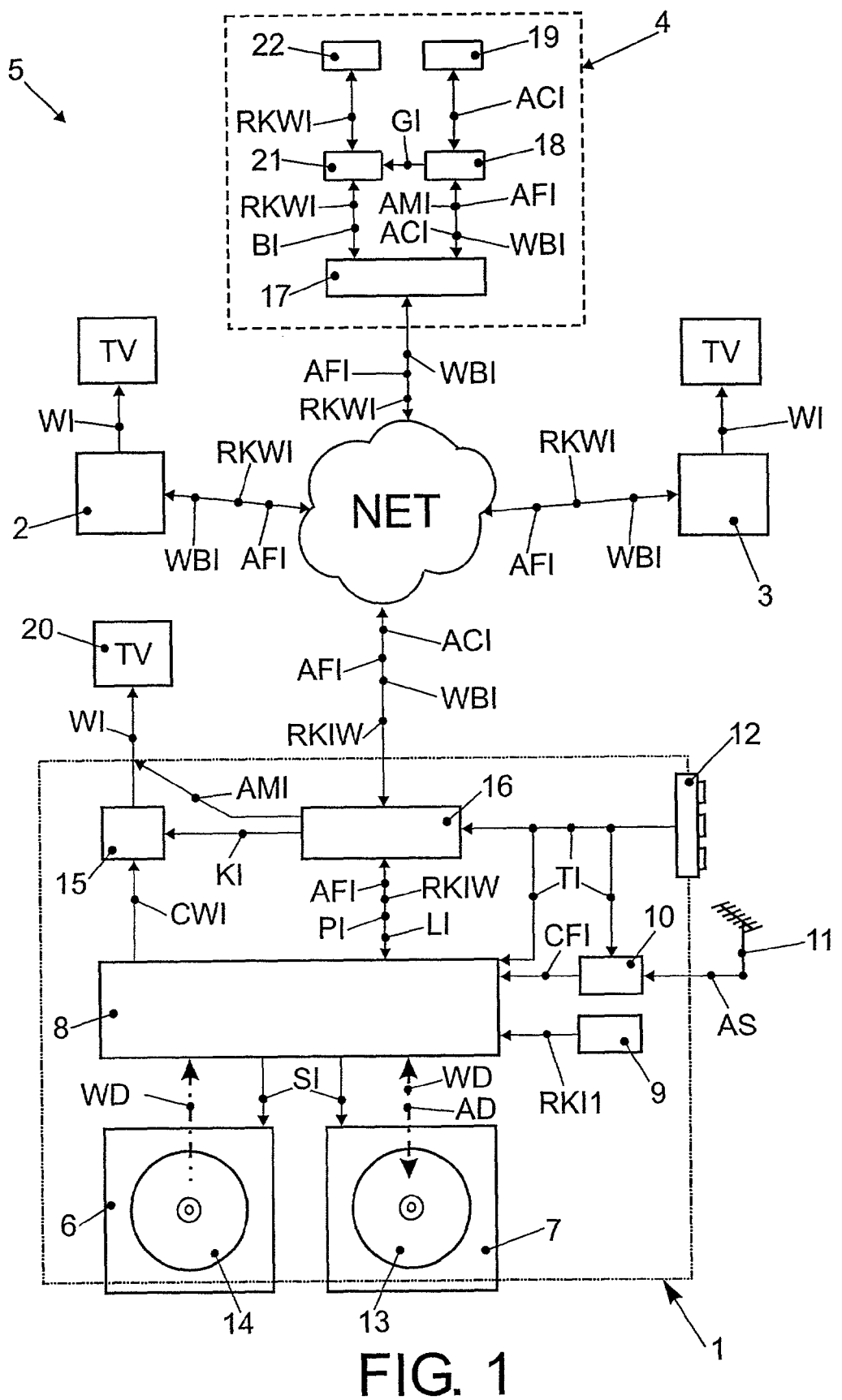

METHOD FOR EVALUATING A BONUS FROM AUTHORIZED PLAYBACKS OF A RECORDING ON A DEVICE OTHER THAN A DEVICE USED TO MAKE THE RECORDING

The invention relates to what is termed a pay per view system, in which a playback device of a user of the pay per view system obtains a playback authorization from an authorizing device before the playback of a coded playback information item from a recording carrier, the user being required to pay a playback charge for the playback—for example of a chargeable film.

The document WO99/03277 discloses such a pay per view system having an authorizing device, a set top box and a playback device, which is formed by a DVD unit. A user of the pay per view system can insert into the DVD unit a DVD disk on which a chargeable film is stored as coded playback information.

If the user of the DVD unit would like to play back the film, he must pay the playback charge for each playback of the film, as is customary in the case of pay per view systems. In addition to the coded playback information, there is stored on the DVD disk a communication address (Internet address, telephone number, . . . ) of the authorizing device as link information, which authorizing device is authorized to grant a playback authorization for playing back the chargeable film.

When the user activates the playback operating mode of the DVD unit, the DVD unit reads out the communication address of the authorizing device from the DVD disk and outputs this to the set top box. Thereupon, if possible, the set top box obtains a playback authorization for the chargeable film from the authorizing device. If the user of the DVD unit has a valid account with the authorizing device, or has inserted a membership card with a prepaid credit into the set top box, the playback authorization for the chargeable film is then obtained, a key information item for decoding the coded playback information item being transferred to the set top box. The playback information item decoded by the set top box is output to a television set connected to the set top box for the purpose of playing back the film.

The operators of the known pay per view system can now secure more receipts, the more often a chargeable film is played back. In this sense, the operator of the pay per view system could allow specific users of the system a quantity rebate. The quantity rebate could be allowed to a user of the system in such a way that the user account is credited an amount of money when the user has played back, and also paid for, a specific number of chargeable films during a billing period of one month, for example.

However, it has proved to be disadvantageous in the case of the known pay per view system that there is no incentive for a user of the system to canvass an acquaintance or friend as a new user for the pay per view system, in order thus to increase the number of playbacks of chargeable films.

The invention has set itself the object of creating a pay per view system in accordance with the generic type specified in the first paragraph, in the case of which each user of the system canvasses new users for the pay per view system voluntarily through an incentive.

In order to achieve the object specified above, in such a pay per view system a bonus determining method is processed which can be characterized in the way specified below.

A bonus determining method for determining a bonus information item for a user of a recording device, the following steps being processed:

recording a coded playback information item, and recording a link information item which identifies an authorizing device authorized to grant a playback authorization for the coded playback information item, and recording at least one recorder identification information item on a recording carrier with the aid of the recording device, the recorder identification information item identifying the recording device;

obtaining a playback authorization for the coded playback information item, played back with the aid of a playback device from the recording carrier or from a copy of the recording carrier, from the authorizing device identified by the played back link information item, in order to permit a pay per view billing of a playback charge;

transferring the at least one recorder identification information item, played back from the recording carrier or from the copy of the recording carrier, to the authorizing device identified by the played back link information item; and determining the bonus information item for the user of the recording device from the number of recorder identification information items transferred during a billing period from playback devices to the authorizing device and identifying the recording device.

In order to achieve the object specified above, in a playback device for such a pay per view system inventive features are provided such that a playback device according to the invention can be characterized in the way specified below.

A playback device for obtaining a playback authorization for playing back a coded playback information item recorded on a recording carrier having playback means for playing back the coded playback information item and for playing back a link information item which identifies an authorizing device authorized to grant the playback okeauthorization for the coded playback information item, and for playing back at least one recorder identification information item from the recording carrier, the recorder identification information item identifying a recording device with the aid of which the coded playback information item was recorded on the recording carrier, and having communication means for establishing a communication link, identified by the link information item, played back from the recording carrier, with the authorizing device, in order to obtain the playback authorization for the playback information item played back from the recording carrier, the communication means being designed for transferring the at least one recorder identification information item, played back from the recording carrier, to the authorizing device.

In order to achieve the object specified above, in an authorizing device for such a pay per view system inventive features are provided such that an authorizing device according to the invention can be characterized in the way specified below.

An authorizing device for granting a playback authorization for playing back a coded playback information item with the aid of a playback device, and for determining a bonus information item for a user of a recording device, having communication means for receiving a playback authorization inquiry information item, which identifies the playback device and a coded playback information item provided by the playback device for playing back from the recording carrier, and which includes a recorder identification information item, the recorder identification information item identifying the recording device with the aid of which the coded playback information item provided for playing back was recorded on the recording carrier, and having authorizing means [sic] for checking whether a successful pay per view billing of a playback charge is warranted for the user of the playback device and, in the event of a positive checking result, for billing the playback charge for playing back the playback information item, and for outputting a grant of playback authorization information item to the playback device, and having bonus information determining means for determining the bonus information item for the user of the recording device from the number of recorder identification information items transferred during a billing period from playback devices to the authorizing device and identifying the recording device.

This yields the advantage that with the aid of his recording device a user of the pay per view system records a chargeable film that interests him and makes it available to a friend or acquaintance. According to the invention, the recorder identification information item recorded on the recording carrier and identifying the recording device of the user is transferred from the playback device of the new user to the authorizing device when the new user has obtained the playback authorization for this chargeable film. The authorizing device determines the bonus information item for the user of the recording device from the number of recorder identification information items, received within a month from playback devices, for example, which identify the recording device of the user.

The bonus determining method according to the invention provides a profitable method for obtaining higher sales in a pay per view system. The playback device according to the invention automatically transfers the recorder identification information item required for the determination to the authorizing device, thus permitting simple determination of the bonus information item and simple conversion of the bonus information item into an advantage for the user of the recording device. With the aid of the authorizing device according to the invention, firstly the playback authorization for chargeable films is granted, and secondly the bonus information item is calculated, which need not be the case but is advantageous.

In accordance with an embodiment of the present system, the advantage is achieved that the user of the recording device comes to enjoy a bonus through the authorizing device only when the user of the playback device has also actually paid for playing back the chargeable film. Misuse of the bonus system is thereby effectively avoided.

In accordance with an embodiment of the present system, the advantage is achieved that such inquiries via data lines of the Internet can be carried out in a particularly cost-effective and simple way.

In accordance with an embodiment of the present system, the advantage is achieved that the authorizing device logically combines the user data identifying the user of the system with the recorder identification information items identifying the recording devices and/or playback devices of the user. A plurality of units (for example two DVD units, a DVHS unit and a computer) can therefore advantageously participate for one user in the pay per view system.

In accordance with an embodiment of the present system, the advantage is achieved that the bonus information item is determined in accordance with the snowball principle. When a first recording carrier has been copied from a first user with a first recording device onto a second recording carrier, and this second recording carrier has been passed on to a second user and has been copied from the latter with a second recording device onto a third recording carrier, the recorder identification information items of the first and of the second recording devices are stored on the third recording carrier. When this third recording carrier is now played back by a playback device of a further user of the pay per view system, both the first and the second recorder identification information items of the first and second recording devices are then transferred to the authorizing device, and taken into account when determining the bonus information item for the users of the first and the second recording devices.

In accordance with an embodiment of the present system, the advantage is achieved that the playback device is additionally suitable for recording a chargeable film and for providing a copy of the recording carrier.

The invention is described below with the aid of an exemplary embodiment illustrated in the figures, to which the invention is not, however, limited.

FIG. 1 shows a pay per view system in which three playback devices communicate via the Internet with an authorizing device, in order to obtain playback authorizations for playing back coded playback information items, recorded on DVD disks, of chargeable films.

FIG. 1 shows a first DVD recorder 1, a second DVD recorder 2, a DVD player 3 and a server 4, all of which are connected to the Internet NET and form what is termed a pay per view system 5. In the pay per view system 5, users of the DVD units 1, 2 and 3 must pay a playback charge for each playback of a chargeable film stored on a DVD disk as coded playback information CWI. The playback charge is billed via what is termed a user account at the server 4, which forms an authorizing device and whose operator has been empowered to grant the playback authorization by the copyright holder of the film.

The first DVD recorder 1 includes a DVD playback stage 6, a DVD recording stage 7 and data processing means 8 which together form recording and playback means for recording recording data AD on a DVD disk and for playing back the recorded recording data AD from the DVD disk as playback data WD. Included in the playback data WD is the coded playback information item CWI of the chargeable film, which can include audio information, video information and additional information concerning the film. Included in the playback data WD is, furthermore, a link information item LI which is formed by the Internet address of the server 4 and identifies the server 4 as the authorizing device authorized to grant a playback authorization for the film represented by the playback data WD.

Included in the played back playback data WD is at least one recorder identification information item RKI which identifies a recording device. The recorder identification information item RKI is included as what is termed a watermark in the noise signal of the color signal of the recorded chargeable film, in order to prevent manipulation of the recorded recorder identification information item RKI.

The chargeable film has been recorded on a DVD disk with the aid of the recording device identified by this recorder identification information item RKI. If still further recorder identification information items RKI are recorded on the DVD disk played back by the DVD unit 1, 2 or 3, then these were used finally to copy the DVD disk played back by the DVD unit 1, 2 or 3 in a chain of copies by the recording devices identified [lacuna] further recorder identification information items RKI. This is examined in more detail below with the aid of examples.

The first DVD recorder 1 includes a recorder identification memory 9 in which a first recorder identification information item RKI1 identifying the DVD recorder 1 is stored. The second DVD recorder 2 has the same design as the first DVD recorder 1 illustrated in detail, the only difference being that there is stored in the recorder identification memory of the second DVD recorder 2 a second recorder identification information item RKI2 which identifies the second DVD recorder 2. By contrast with the first DVD recorder 1, no DVD recording stage is provided in the DVD player 3, and a third recorder identification information item RKI3 is stored in the recorder identification memory. The recorder identification information items RKI1, RKI2 and RKI3 can be formed, for example, by manufacturer serial numbers which have been stored in the recorder identification memories during manufacture of the DVD units 1, 2 and 3.

The first DVD recorder 1 further includes a tuner 10 to which it is possible to output an antenna signal AS from an antenna 11 connected to the DVD recorder 1. It is also possible, inter alia, to receive in the antenna signal AS coded television information items CFI of chargeable films, transmitted in an encrypted fashion, from a plurality of television corporations (for example Premiere). Also included in the receivable coded television information items CFI are corresponding link information items LI which identify the authorizing devices respectively empowered to grant a playback authorization.

The first DVD recorder 1 includes a keyboard 12 with the aid of which a user of the first DVD recorder 1 can control the first DVD recorder 1 or input input information items. A key information item TI corresponding to the keys pressed by the user is output by the keyboard 12 to the tuner 10 as well, inter alia. By actuating a channel-up key and a channel-down key of the keyboard 12, the user can select one of the coded television information items CFI, included in the antenna signal AS, of a chargeable film, which are then output to the data processing means 8.

Once the user of the first DVD recorder 1 has activated a recording operating mode of the first DVD recorder 1, the data processing means 8 then process the coded playback information item CWI, included in the received coded television information item CFI, and link information item LI, and insert these, together with the first recorder identification information item RKI1, read out from the recorder identification memory 9, into the recording data AD. These recording data AD are thereupon recorded on the DVD disk 13 included in the DVD recording stage 7.

Coded playback information items CWI of a television transmitter are thereby recorded on the DVD disk 13, from which television transmitter the user of the DVD recorder 1 has for the present not obtained any playback authorization, that is to say has not paid any membership charge to the television transmitter. The playback charge for the chargeable film does not become due until a later point in time when the user of the DVD recorder 1 plays back the recorded chargeable film. Such a system is also disclosed, for example, in WO99/03277, the disclosure of which is taken as being included by this reference in the disclosure of this document.

Once the user of the first DVD recorder 1 has activated a copying operating mode of the first DVD recorder 1 by actuating a copying key of the keyboard 12, the data processing means 8 use control information items SI to activate the playback operating mode of the DVD playback stage 6 and the recording operating mode of the DVD recording stage 7. The information items (coded playback information item CWI, link information item LI and played back recorder identification information items RKIW) included in the playback data WD played back by the DVD playback stage 6 from a DVD disk 14 are inserted by the data processing means 8 together with the first recorder identification information item RKI1 into the recording data AD to be recorded on the DVD disk 13 with the aid of the DVD recording stage 7.

It is advantageously achieved thereby that the DVD disk 13 has stored on it the recorder identification information items RKI of each DVD recorder which has contributed to creating the copy, stored on the DVD disk 13, of the chargeable film. It is therefore possible to trace back to the DVD recorder with the aid of which the chargeable film was originally recorded, and to the DVD recorders which created copies in a chain which finally led to the copy of the chargeable film recorded on the DVD disk 13. This method, described as watermarking in an article entitled "Digital watermarking for DVD video copy protection (IEEE Signal Processing Magazine, Volume: 17 Issue: Sep. 5, 2000)" permits the tracing of persons who have created illegal pirate copies of a DVD disk paid as an original.

According to the invention, this known tracing possibility is evaluated not for the purpose of punishment for the creation of illegal pirate copies, but for the purpose of determining a bonus information item for users who contribute to higher sales of the pay per view system 5 by creating copies of the recording carrier, something which is examined in more detail below.

In one playback operating mode of the first DVD recorder 1, the data processing means 8 output the coded playback information item CWI included in the played back playback data WD to a decoder stage 15, and output the link information item LI included in the played back playback data WD to communication means 16 of the first DVD recorder 1. As soon as the data processing means 8 have detected that the playback information item CWI included in the playback data WD is coded or encrypted, the data processing means 8 interrupting [sic] the playback of playback data WD with the aid of the DVD playback stage 6 and create an inquiry information item AFI, which they output to the communication means 16. This inquiry information item AFI thereby includes the first recorder identification information item RKI1, stored in the first DVD recorder 1, and an item of information concerning the chargeable film which is to be played back from the DVD disk 14.

The communication means 16 include a modem that is connected to the Internet NET. In the case of the reception of the link information item LI and the inquiry information item AFI by the data processing means 8, the modem is designed for establishing a data link with the server 4 identified by the link information item LI, and for transmitting the inquiry information item AFI to the server 4.

The server 4 includes communication means 17 and accounting means which are formed by an accounting stage 18 and an accounting memory 19. A modem of the communication means 17 is connected to the Internet NET and designed for receiving the inquiry information item AFI from the DVD units 1, 2 and 3. The inquiry information item AFI received by the communication means 17 is output to the accounting stage 18.

Thereupon, the accounting stage 18 checks whether a valid account has been set up at the server 1 for the user, who is identified by the first recorder identification information item RKI1, included in the inquiry information item AFI, of his first DVD recorder 1. A valid account or a suitable billing option with a user is present whenever personal data and an account number or credit card number of the user are known concerning the user and, if appropriate, have already been used once successfully for billing playback charges. A subscription procedure is processed when such data of a user together with an associated recorder identification information item RKI have not yet been stored in the accounting memory 19 of the server 4.

During the processing of the subscription procedure, the accounting stage 18 sends a subscription information item AMI to the communication means 16 via the communication means 17 and the Internet NET. Connected to the first DVD recorder 1 is a television set 20 to which it is possible to output the playback information item WI, decoded by the decoder stage 15, of a film, and also the subscription information item AMI from the communication means 16. The subscription information item AMI represented with the aid of the television set 20 shows a subscription form for the user to subscribe at the server 4 for the pay per view system 5. The user can fill out the subscription form by means of the keyboard 12.

Once the user of the first DVD recorder 1 has filled out the subscription form, an accounting information item ACI including the user data input by the user is output by the communication means 16 to the accounting stage 18 via the Internet NET and the communication means 17. The accounting stage 18 thereupon checks the plausibility of the user data received in the accounting information item ACI, the accounting stage 18 making contact with a server, connected to the Internet NET, of the credit card company (for example VISA), and checking the user data. If the user data are plausible, the accounting stage 18 stores the received user data in the accounting memory stage 19, as a result of which a new valid account has been set up for the user of the first DVD recorder 1, and the subscription procedure is terminated.

When the accounting stage 18 establishes upon receiving the inquiry information item AFI that the user, identified by the first recorder identification information item RKI1, of the first DVD recorder 1 has a valid account, the accounting stage 18 debits the playback charge due for playing back the chargeable film specified in the inquiry information item AFI to the account of the user, and transfer [sic] a playback authorization information item WBI to the communication means 16 of the first DVD recorder 1. The playback authorization information item WBI includes the key information item KI required for decoding the played back coded playback information item CWI by means of the decoder stage 15.

Once the playback operating mode has been activated in the first DVD recorder 1 and, after the outputting of the inquiry information item AFI, the communication means 16 have received the corresponding playback authorization information item WBI from the server 1, the communication means 16 output a play information item PI to the data processing means 8, and the received key information item KI to the decoder stage 15.

The data processing means 8 are designed in the event of the reception of the play information item PI for terminating the interruption of the playback of the playback data WD from the DVD disk 14, and thereupon continuously output the coded playback information item CWI, included in the played back playback data WD, to the decoder stage 15. The decoder stage 15 is designed to use the received key information item KI to decode the coded playback information item CWI and to output the decoded playback information item WI to the television set 20, whereupon the chargeable film is played back for the user.

A bonus system for raising the number of playbacks of chargeable films is now further provided in the pay per view system 5. In accordance with the bonus system, a user of a DVD recorder receives a bonus when he outputs a chargeable film, recorded on a DVD disk with the aid of his DVD recorder, to another, possibly new user of the pay per view system 5 and this other user has paid a playback charge for playing back the film.

For this purpose, the DVD recorder [sic] 1 additionally transfers to the server 1 in the inquiry information item AFI all the played back recorder identification information items RKIW included in the played back playback data WD. The server 1 includes bonus determining means which are formed by a bonus determining stage 21 and a bonus memory 22.

When the communication means 17 receive the inquiry information item AFI, the communication means 17 output the played back recorder identification information items RKIW, included in the received inquiry information item AFI, to the bonus determining stage 21. When the accounting stage 18 output [sic] the playback authorization information item WBI to the communication means 17, and it therefore establishes that the playback charge has been debited to the user's account, the accounting stage 18 outputs a confirmation information item GI to the bonus determining stage 21. Upon receiving the confirmation information item GI, the bonus determining stage 21 checks whether the played back recorder identification information items RKIW now confirmed have already been received once and therefore already stored in the bonus memory 22. If this is the case, a stored bonus number assigned to this recorder identification information item RKIW is increased by the value of one. Otherwise, the recorder identification information item RKWI received for the first time is stored in the bonus memory 22 with an associated bonus number of one.

This yields the advantage that the bonus number stored in the bonus memory 22 in a fashion assigned to a recorder identification information item RKIW specifies the number of chargeable playbacks of films which a user of the DVD recorder identified by the recorder identification information item RKIW has rendered possible by creating a copy of the chargeable film. The bonus numbers stored in the bonus memories 22 can be evaluated at the end of a billing period by the bonus determining stage 21 in order to pass on a benefit to the users, identified by means of the recorder identification information items RKIW and designated in more detail in the accounting memory 19, in gratitude for their support. This benefit can be given by a rebate for the next playback charges or by a one-off credit amount which is credited to the user's account.

If the recorder identification information item RKI of the DVD unit playing back the DVD disk should also be included in the played back recorder identification information items RKWI, the user's own recorder identification information item RKI is then not inserted into the inquiry information item AFI and transferred to the server 4. This yields the advantage that the user's own recordings which are subsequently played back do not lead to a bonus for the user of the DVD recorder.

An example of the application of the pay per view system 5 is now explained below in accordance with FIG. 1. In accordance with this example of application, it is assumed that the user of the first DVD recorder 1 receives the chargeable film "Vertical Limits" as a coded television information item CFI from the Premiere television transmitter and records it on the DVD disk 13. In this process, in addition to the coded playback information item CWI, included in the coded television information item CFI, of the film and the link information item LI identifying the Internet address for the server 4, the first recorder identification information item RKI1 is also recorded as recording data AD on the DVD disk 13.

One week later, the user of the first DVD recorder 1 decides to view the film "Vertical Limits" and activates the playback operating mode of the DVD recorder 1. Since the user of the first DVD recorder 1 has a valid account at the server 1, the server 1 debits the playback charge of five euros to the account of the user and transfers the key information item KI for decoding the coded playback information item CWI in the playback authorization information item WBI to the first DVD recorder 1.

Since only the first recorder identification information item RKI1—that is to say only the user's own recorder identification information item RKI1—is included in the playback data WD played back from the DVD disk 13, in this case the first DVD recorder 1 transfers no played back recorder identification information item RKIW in the inquiry information item AFI, and therefore neither is any bonus determined for the user of the first DVD recorder 1 for playing back his own recording.

In accordance with the example of application, it is now further assumed that the user of the first DVD recorder 1 is so enthusiastic about the film "Vertical Limits" that he creates a copy of the DVD disk 13 for the user of the second DVD recorder 2, and loans the DVD disk 13 to the user of the DVD player 3. It is now further assumed that the user of the second DVD recorder 2, who already has a valid account at the server 1, and that the user of the DVD player 3, who sets up a new valid account at the server 1, play back the film "Vertical Limits" with the aid of their DVD units 2 and 3, after payment of the playback charge.

Owing to these two additional playbacks of the chargeable film, the bonus determining means 21 raise by the value of two the bonus number stored in the bonus memory with reference to the first recorder identification information item RKI1. After one month, the user of the first DVD recorder 1 receives the information item that it has been possible owing to his copies of DVD disks to bill seven chargeable playbacks, for which reason his account has been credited with the amount of seven euros.

The above-described bonus system of the pay per view system 5 therefore yields the advantage that users of the pay per view system 5 have an interest in supporting further chargeable playbacks by acquaintances. Since all recorder identification information items RKIW recorded on a DVD disk and played back during the playback are taken into account in determining the bonus information item, the result is what is termed a snowball effect that resembles a pyramid system and constitutes a substantial incentive to canvass for new users of the system.

The operator of the pay per view system additionally has the benefit that the chargeable films are recorded by the users on DVD disks and are distributed to interested customers. The operator therefore saves on creating and distributing a large number of copies of DVD disks with chargeable films for the playing back of which the playback charge is billed by his server 4.

Since a played back recorder identification information item RKWI transferred to the authorizing device is not rated for the purpose of determining the bonus information item BI until the playback authorization has actually been granted, the result is that a benefit is awarded to a user only when the operator of the system also had a benefit.

It may be mentioned that a bonus system according to the invention for a pay per view system can be implemented with the aid of any desired recording and playback devices which, for example, use a magnetic tape cassette, a hard disk or a read-only memory as exchangeable recording carrier.

It may be mentioned that coded television signals CFS can also be received via satellite or cable TV and subsequently be recorded.

It may be mentioned that recording and playback devices can also communicate with authorizing devices of a pay per view system via telephone or other communication links.

It may be mentioned that users of the system can also be granted a multiplicity of other benefits for the bonus information item. Thus, for example, the user who has reached the highest bonus value at the end of the billing period could be awarded a trip.

It may be mentioned that a bonus information item can also be determined for a user of a recording device who is not directly a user of the pay per view system. In this case, the benefit for this user could be granted, for example, as a reduction in his telephone charges or a free telephone.

It may be mentioned that it is possible to establish from the sequence of the recorder identification information items recorded on a recording carrier whether users wish to misuse the bonus system. If, for example, the recorder identification information item of a recording device is recorded multiply on a recording carrier, and would therefore be rated multiply for playing back the chargeable film, it then makes sense to rate this recorder identification information item only once when determining the bonus information item.

It may be mentioned that it is also possible to take account of weightings of the recorder identification information items when determining the bonus information item. Thus, the recorder identification information items received by the authorizing device for playing back a recording carrier could be rated with a lower weighting when a large number of recorder identification information items are received for playing back a recording carrier.

It may be mentioned that a playback device according to the invention could also be designed for the purpose not of inserting the played back recorder identification information items RKIW into the inquiry information item AFI, but of transmitting them to the authorizing device only after receiving the playback authorization information item WBI. In this case, the transfer of the confirmation information item GI from the accounting stage to the bonus determining stage could be eliminated.

It may be mentioned that the bonus determining means can also be accommodated in a server separate from the authorizing means.

It may be mentioned that a DVD disk can correspond to the DVD-RAM, the DVD+RW or the DVD-RW standard.

It may be mentioned that the recording carrier need not be inserted physically into the playback device. It would be possible, for example, for a user of a hard disk recorder to record a chargeable film as a coded playback information item CWI on a hard disk of his hard disk recorder, in which case the recorder identification information item of the hard disk recorder would also be recorded in accordance with the invention. Subsequently, he could inform a friend about this interesting film on his hard disk, who could thereupon activate a download playback operating mode of his playback device. After the playback authorization has been obtained by the playback device, the coded playback information item of the film would then be played back from the hard disk of the hard disk recorder.

The invention claimed is:

1. A bonus determining method for determining a bonus information item for a first user of a recording device, the following acts being processed:
   recording a coded playback information item, and recording a link information item which identifies an authorizing device authorized to grant a playback authorization for the coded playback information item, and recording at least one recorder identification information item on a recording carrier with the aid of the recording device, the recorder identification information item identifying the recording device that performs the recording;
   obtaining a playback authorization for the coded playback information item, played back with the aid of one or more playback devices associated with corresponding one or more second users from the recording carrier or from a copy of the recording carrier, from the authorizing device identified by the link information item, in order to permit a pay per view billing of a playback charge;

transferring the at least one recorder identification information item, played back from the recording carrier or from the copy of the recording carrier, from the one or more playback devices to the authorizing device identified by the link information item; and determining the bonus information item for the first user of the recording device from the number of recorder identification information items transferred during a billing period to the authorizing device by the one or more second users of the one or more playback devices and identifying the recording device.

2. The bonus determining method as claimed in claim 1, in which a recorder identification information item transferred to the authorizing device from the one or more playback devices when the playback authorization is obtained is only rated for determining the bonus information item for the first user of the recording device when the authorizing device has actually also granted the playback authorization to the one or more playback devices.

3. The bonus determining method as claimed in claim 1, in which the link information item represents an Internet address of the authorizing device, and in which both the obtaining of the playback authorization from the authorizing device and the transferring of the recorder identification information item to the authorizing device are performed via data lines of the Internet.

4. The bonus determining method as claimed in claim 1, in which the authorizing device stores user data for billing the playback charge to the one or more second users together with at least one recorder identification information item which identifies a recording device and/or playback device.

5. A playback device for obtaining a playback authorization for playing back a coded playback information item recorded on a recording carrier having playback means for playing back the coded playback information item and for playing back a link information item which identifies an authorizing device authorized to grant the playback authorization for the coded playback information item, and for playing back at least one recorder identification information item from the recording carrier, the recorder identification information item identifying a recording device of a first user that recorded the coded playback information item on the recording carrier, and having communication means for establishing a communication link, identified by the link information item, played back from the recording carrier, with the authorizing device, in order to obtain the playback authorization for the playback information item played back from the recording carrier, the communication means being designed for transferring the at least one recorder identification information item, played back from the recording carrier by the playback device and transferred to the authorizing device, and for providing a bonus information item for the first user from the number of recorder identification information items transferred during a billing period to the authorizing device by a second user that uses the playback device to play back the coded playback information item.

6. The playback device as claimed in claim 5, in which the communication means transfer the at least one played back recorder identification information item to the authorizing device only when the authorizing device has actually also granted the playback authorization.

7. The playback device as claimed in claim 5, in which the communication means are designed for establishing, by means of the link information item representing an Internet address, the communication link with the authorizing device via the Internet, and in which both the obtaining of the playback authorization from the authorizing device, and the transferring of the recorder identification information item to the authorizing device are performed via data lines of the Internet.

8. The playback device as claimed in claim 5, in which the playback means are designed for playing back all those recorder identification information items recorded on the recording carrier, which identify all those recording devices which have contributed to creating the copy of the recording carrier played back by the playback device, and in which the communication means are designed for transferring all the recorder identification information items, played back from the recording carrier, to the authorizing device.

9. The playback device as claimed in claim 5, in which recording means are provided which are designed for recording on the recording carrier the coded playback information item, the link information item and the recorder identification information item identifying the playback device.

10. An authorizing device for granting a playback authorization for playing back a coded playback information item with the aid of one or more playback devices, and for determining a bonus information item for a first user of a recording device, having communication means for receiving a playback authorization inquiry information item, which identifies the one or more playback devices and a coded playback information item provided by the one or more playback devices for playing back from a recording carrier, and which includes a recorder identification information item, the recorder identification information item identifying the recording device that recorded the coded playback information item provided for playing back on the recording carrier, and having authorizing means for checking whether a successful pay per view billing of a playback charge is warranted for one or more second users of the one or more playback devices and, in the event of a positive checking result, for billing the playback charge to the one or more second users for playing back the coded playback information item, and for outputting a grant of playback authorization information item to the playback device, and having bonus information determining means for determining the bonus information item for the first user of the recording device from the number of recorder identification information items transferred during a billing period to the authorizing device by the one or more second users of the one or more playback devices and identifying the recording device.

11. The authorizing device as claimed in claim 10, in which a recorder identification information item included in the playback authorization inquiry information item is only rated for determining the bonus information item for the first user of the recording device when the authorizing device has actually also granted the playback authorization for the one or more playback devices.

12. The authorizing device as claimed in claim 10, in which an account memory is designed for jointly storing user data and at least one recorder identification information item which identifies user data for billing the playback charge to the one or more second users, and which at least one recorder identification information item identifies at least one recording device and/or the one or more playback devices.

13. The authorizing device as claimed in claim 10, in which the authorizing device is formed by a computer server connected to the Internet.

* * * * *